(12) United States Patent  (10) Patent No.: US 8,173,003 B2
Li et al.  (45) Date of Patent: May 8, 2012

(54) TURN-BACK FLOW EDI

(75) Inventors: Xiang Li, Zhejiang (CN); Zhiming Tong, Zhejiang (CN); Hongwu Pan, Zhejiang (CN)

(73) Assignee: Zhejiang Omex Environmental Engineering Co., Ltd., Huzhou, Zhejiang (CN)

( * ) Notice: Subject to any disclaimer, the term of this patent is extended or adjusted under 35 U.S.C. 154(b) by 1406 days.

(21) Appl. No.: 11/666,824

(22) PCT Filed: Nov. 2, 2005

(86) PCT No.: PCT/CN2005/001822
§ 371 (c)(1),
(2), (4) Date: Apr. 30, 2007

(87) PCT Pub. No.: WO2006/047945
PCT Pub. Date: May 11, 2006

(65) Prior Publication Data
US 2008/0105552 A1 May 8, 2008

(51) Int. Cl.
*B01D 61/48* (2006.01)
(52) U.S. Cl. .................. 204/632; 204/633; 204/634
(58) Field of Classification Search .......... 204/632–634
See application file for complete search history.

(56) References Cited

U.S. PATENT DOCUMENTS

| | | | |
|---|---|---|---|
| 2,741,591 A | 4/1956 | Dewey, II et al. | |
| 4,225,413 A | 9/1980 | Karn et al. | |
| 4,263,017 A | 4/1981 | Karn et al. | |
| 5,376,253 A | 12/1994 | Rychen | |
| 5,411,650 A | 5/1995 | Frank | |
| 5,858,229 A | 1/1999 | Uemura et al. | |
| 6,149,788 A | 11/2000 | Tessier | |
| 6,190,528 B1 | 2/2001 | Li | |
| 6,248,226 B1 | 6/2001 | Shinmei et al. | |
| 6,296,751 B1 | 10/2001 | Mir | |
| 6,322,698 B1 | 11/2001 | Rios et al. | |
| 6,423,205 B1 | 7/2002 | Akahori et al. | |
| 6,929,748 B2 | 8/2005 | Avijit et al. | |
| 7,029,563 B2 | 4/2006 | Li et al. | |
| 7,097,752 B2 | 8/2006 | Li et al. | |
| 7,261,802 B2 | 8/2007 | Xu et al. | |
| 7,306,709 B2 | 12/2007 | Grebenyuk et al. | |
| 2003/0201235 A1 | 10/2003 | Chidambaran | |
| 2004/0173535 A1 | 9/2004 | Li | |
| 2004/0178075 A1 | 9/2004 | Sato | |

(Continued)

FOREIGN PATENT DOCUMENTS

CN 2426473 Y 4/2001

(Continued)

OTHER PUBLICATIONS

U.S. Appl. No. 10/359,060, filed Feb. 20, 2001, Xiang Li, (Commonly owned pending re-issue of US 6190528).

*Primary Examiner* — Arun S Phasge
(74) *Attorney, Agent, or Firm* — Edward W. Black

(57) ABSTRACT

The present invention discloses a turn-back electrodeionization apparatus in which the central section of cation exchange membrane and anion exchange membrane constituting a dilute chamber is adhered along axial direction, and the dilute chamber is separated into an inner side dilute chamber unit and an outside dilute chamber unit, so that the dilute sequentially flows through the outside dilute chamber unit and inner side dilute chamber unit in a turn-back way.

18 Claims, 5 Drawing Sheets

U.S. PATENT DOCUMENTS

| | | |
|---|---|---|
| 2006/0091013 A1 | 5/2006 | Takahashi et al. |
| 2006/0163056 A1 | 7/2006 | Grebenyuk et al. |
| 2006/0169580 A1* | 8/2006 | Grebenyuk et al. ........... 204/272 |
| 2007/0163891 A1 | 7/2007 | Menzel et al. |

FOREIGN PATENT DOCUMENTS

| | | |
|---|---|---|
| CN | 1426970 A | 7/2003 |
| EP | 0819466 | 11/2004 |
| JP | 2001198576 | 1/2000 |
| JP | 2000084371 | 3/2000 |
| JP | 2000126777 | 5/2000 |
| JP | 2000263058 | 9/2000 |
| WO | WO 03031034 | 4/2003 |
| WO | 2005042808 | 5/2005 |

* cited by examiner

TURN-BACK FLOW EDI

CROSS REFERENCE TO RELATED APPLICATIONS

This application is a National phase application of PCT/CN05/001822 filed Nov. 2, 2005, which claims the priority benefit of CN Patent Application Serial No. 200410067857.1, filed Nov. 2, 2004.

FIELD OF THE INVENTION

The present invention relates to an electrodeionization apparatus, in particular to a turn-back electrodeionization apparatus.

BACKGROUND OF THE INVENTION

Electrodeionization (EDI) is a membrane separation deionization technique that combines the techniques of electodialysis and ion exchange. EDI purification apparatus has many advantages, such as, producing water continuously, regenerating ion exchange resins without using alkalis and acids, automatically operating, etc. It has gradually replaced mixed bed as the final water treatment apparatus used in pure water preparation systems. After having been studied, practiced and developed for more than fifty years, EDI technique began to be recognized by more and more people and widely applied to medicine, electronic, electric power, and chemical industries, due to its environment friendly and easy to operate characteristics.

The earliest published and commercialized EDI apparatus all have a "stacked plate" structure, which is a mature structure made by a technique derived from electodialysis. However, the structure has disadvantages of poor pressure endurance, ease to leak during operation, high maintenance (the filled resins can't be replaced), easily producing leakage of electric field due to its open electric field which results in high energy consumption. CN 9822354.3 and U.S. Pat. No. 6,190,528 disclose a helical wound membrane electrodeionization apparatus, which overcomes the deficiencies aforementioned. The helical wound structure has a concentric and closed electric field with low energy consumption. In particular, the novel separated structure of the helical wound structure EDI enables the convenient replacements of the membrane module and resins, making it easier for maintenance.

In the prior art, the existence of organics in pretreated water often causes irreversible damages to the membranes of the electrodeionization apparatus, especially to filled ion exchange resins. The damages are more evident in the case of anion resins. Given gel resin as an example, the resin particulates as a whole is completely comprised of interior channels defined by interconnected cracks with different sizes. Generally, the cracks' size is between 20 and 40 Å, and the cracks' surfaces are distributed with active functional groups. The functional groups could release ions, which may further exchange with ambient external ions. When being adsorbed by the resins (usually anion resins), the organics in the water will attach to the surfaces of the resin particulates and their network cracks, causing difficulties for the diffusion of ions. This kind of adsorption is very stable and difficult to desorb, especially in the case that the organics enter the resin particulate structure and reach the interior exchange positions, where the organics will twist each other and can hardly be separated from the resin structure with any commonly used regeneration methods. As a result, the overall exchange capacity of resin is decreased. Moreover, the carboxyl group of the organics often changes the polarity of the exchange groups in this region.

In the dilute flow of the EDI module, the mobile ions absorption characteristic of the functional groups forms a "fast passage," through which the inorganic ions in solution migrate to membrane surface under direct current. Compared with the volume of continuously flowing water feed through the electrodeionization apparatus, the amount of the ion exchange resins filled in EDI is very small. As a result, once the ion exchange passage is contaminated by the organics, the impact on the overall performance of the electrodeionization apparatus is much more severe than that on a common deionization (DI) unit. Since the contaminated resins are difficult to be regenerated, if the structure of EDI makes it impractical to replace the resins, the entire EDI unit will be discarded.

During operation of the EDI apparatus, in order to ensure that the filled resins are substantially and continuously regenerated, the total organic carbons (TOC) of the feed water must be maintained at an amount below 0.5 ppm. In practice, particularly in the case of treating surface water, shallow groundwater or polluted groundwater, although the feed water will be generally pretreated with a conventional reverse osmosis process and the TOC of the product water will be controlled to a level below 0.5 ppm, the EDI apparatus breakdown frequently due to the accumulation of pollutants on the filled resins over long time of operation. To solve the problem, manufactures applied two-stage reverse osmosis process, i.e. the water produced in the first reverse osmosis process will flow into another reverse osmosis module, to produce pretreated water with a TOC below 200 ppb. However, this leads to high energy consumption and high investment cost. Practically, in order to improve the performance of the EDI apparatus, it is effective and economic to replace the filled resins and even the membrane module when the filled resin has been accumulated with contaminant over time.

In the prior art, technicians in the field have attempted to solve many technical problems coming out during practical operation of the EDI apparatus, which include:

The ability of removing weak electrolytes such as silicon, boron etc is one of the most important factors for measuring the quality of water produced by EDI apparatus. CN1585727 discloses an EDI apparatus with improved removal ratio of silicon and boron in the feed water, wherein ion exchange resins are filled in the desalting chamber and the concentrating chamber; part of the product water is recycled to water inlet to reduce the concentration of; and the concentrated water is discharged. A water treatment system with a low boron content detection control device is disclosed in WO 03031034, wherein a desired desalting effect was obtained by detecting the boron content in the water treatment system and controlling the current and voltage of a EDI apparatus.

Scaling problem of EDI apparatus: U.S. Pat. No. 6,149,788 discloses a method and an apparatus for inhibiting the scale formation of the electrodeionization apparatus system, and particularly for improving the tolerance of the apparatus to the hardness of feed water by inhibiting the precipitation of metal ions in feed water, thereby improving the water treatment efficiency of apparatus.

CN 1615273 disclosed a fractional electrodeionization method for treating a liquid, wherein ions are sequentially removed in term of their ionic intensities without the formation of precipitation or scale. In the method, the whole EDI apparatus is divided into two sections, and the operation voltages for each of sections are adjusted according to the water quality, respectively.

The aforementioned CN 9822354.3 and U.S. Pat. No. 6,190,528 also disclose a helical wound EDI apparatus. In the apparatus, an insulated net-separating partition is disposed between a pair of anion and cation exchange membranes to form a special membrane bag. The opening side of the membrane bag is in liquid communication with water gathering aperture slotted in a side wall of the concentrated-water-gathering pipe to form a concentrated water chamber. An insulated net is placed between the adjacent membrane bags, and the two ends of the net are sealed by adhesives to form a dilute chamber into which ion exchange resin particulates can be filled. Then, they wound around the concentrated-water-gathering pipe to form a cylinder structure. The cylinder is then wrapped by a metal crust from outside, which is in turn coated by an insulated polymer layer. Meanwhile, a filter and a cover are fitted in both ends of the cylinder membrane module. The above-mentioned structure has many advantages, such as, simple in structure, highly effective availability of membrane, low resistance of dilute chamber, less pressure drops, no leakage etc. The structure overcomes the deficiency of the stacked mechanical sheet type EDI, solves the technique problems of scaling and weak electrolyte (e.g., silicon and boron) removing; particularly, it overcomes the difficulty in timely and conveniently replacing the filled resins once they are irreversibly contaminated during the operation of the EDI apparatus, thereby reducing the cost and requirement of pretreatment.

However, this helical wound structure has a defect of uneven distribution of current density. The electric field between the concentric designed cathode and anode is radiate. Therefore, the electric field becomes stronger when getting closer to the central pipe, and becomes weaker contrarily. As a result, desalting performance varies in each section of EDI apparatus, with the closer to the center, the better the performance.

U.S. Pat. No. 5,376,253 discloses a spiral wound EDI apparatus, wherein the cathode and anode are concentrically disposed, and the dilute water flows spirally and radially from the periphery side with weak electric field to the center with strong electric field along radial direction. This solves the problem of the current density difference between the inside and outside. However, in order to ensure the water yield of the apparatus, this structure has to be lengthened in axial direction, hence increasing the length of electrode. Furthermore, the resistance of water flow increases due to the spiral flow of the dilute water, and the structure is complex, making it difficult to fill and replace the resins.

CN 1426970A discloses a wound electodialysis apparatus of circulating concentrated and dilute water, wherein the dilute water flows into the apparatus and flow out through central pipe which is a U-shaped flow passage inside the membrane bag. The concentrate flows through the flow passage along axial direction, and directly flows through the module, and flows out through the outlet in the side of apparatus. This design partially solves the problems caused by the unequal intensity of electric field. However, the design of the flow passage of the concentrate and the dilute is undesirable, making the pressure of the concentrated water higher than that of the dilute in certain areas, which results in the reverse permeation of the concentrate into the dilute chamber, adversely affecting the quality of the product water.

SUMMARY OF THE INVENTION

An object of the present invention is to solve the technical problems in the prior art, which includes unstable product quality due to large current density differences in each section of EDI apparatus, and in particular, undesirable ability of removing weak electrolyte and easy scaling.

Another object of the present invention is to provide a turn-back EDI apparatus, which has desirable structure and can efficiently utilize the current density differences in each section of EDI apparatus to obtain stable product quality. Furthermore, the membrane module and resins of the apparatus can be replaced conveniently, which is more economic.

The above-mentioned technical problems are mainly solved by providing a turn-back EDI apparatus, which comprises a central pipe as an electrode, an outer crust which is concentric with the central pipe, and an outside electrode; upper and lower covers which are disposed at both ends of the central pipe and outer crust respectively; anion and cation exchange membranes which are disposed alternately between the central pipe and outer crust; concentrate chambers and the dilute chambers which are formed between the ion exchange membranes, respectively; a support frame which is fitted in the dilute chamber, and a net-separating partition which is fitted in the concentrate chamber; ion exchange resins which are filled in at least one of the concentrate chamber or dilute chamber. The turn-back EDI apparatus has such a structure that the above mentioned anion and cation exchange membranes, the net-separating partition within the concentrate chamber, the support frame within the dilute chamber, and the ion exchange resins are wound around the central pipe to form a helical wound cylindrical unit, and the electrodes are connected with two terminals of DC electric power respectively to form a concentric electric field, wherein the dilute chamber is separated into an inner side dilute chamber unit and an outside dilute chamber unit, and the dilute flow firstly passes through the outside dilute chamber unit and then the inner side dilute chamber unit so that the dilute flows turned-back. The dilute chamber unit near the central pipe is the inner side dilute chamber unit, and the dilute chamber unit near the outer crust is the outside dilute chamber unit. The dilute flow passes in turn through the outside dilute chamber unit and inner side dilute chamber unit so that the flow in the inner side dilute chamber unit and the flow in the outside dilute chamber unit are connected in series, and the flow of the dilute turn out to be turned-back. Therefore, this structure substantially utilizes the characteristic of the concentric electric field with weaker electric field intensity outside and stronger intensity inside, and the feed water is first deionized by outside electric field, and passes through the inside electric field lastly, so that the weak electrolyte residue in the water is substantially removed in the strong electric field, thereby enhancing the efficiency of deionization, and reducing the electric power consumption. Furthermore, the turn-back design shortens the axial length, saving the expensive electrode material, and reducing manufacture cost.

In the EDI apparatus, the salt ions in the feed water will have three migration manners:
 (1) The cations and the anions exchanges with the cation and anion exchange resins respectively, and therefore attach to the resin particles;
 (2) The ions migrate under the influence of electric field through the ion-flow passage formed by resin particles. This is because that in the application systems of EDI, the electric conductivity of the resin is several magnitudes higher than that of the water solution; and
 (3) The ions migrate into the concentrate chamber through the ion exchange membranes, and hence complete the process of water deionization.
 (4) Under a certain current density, the water is decomposed into $H^+$ and $OH^-$ due to the concentration polarization in the interface of the resin membrane and water, and the resin is therefore regenerated.

In the EDI apparatus, the process of ion exchange, the process of electrodialysis, and the process of the resin regeneration occur concurrently. As a result, the EDI apparatus can operate continuously, stably, and achieve a high level of deionization of the water to produce highly purified or ultra-pure water. But in the EDI module, the deionization sequence of each kind of ions is different. The first deionized ions are the ions with high valence, such as $Ca^{2+}$, $Mg^{2+}$ etc., followed by ions which have lower valence and are easy to deionize, such as $Na^+$, $Cl^-$ etc. The ions deionized at last are weak ions, such as, $HSiO_3^-$, $CO_3^{2-}$ etc, and $H^+$, $OH^-$. In the turn-back design of EDI of the present invention, the feed water to be treated first flows into the outside dilute chamber unit of the apparatus. Although the electric field of outside dilute chamber unit is weak, it is enough to deionize the ions with high valence, such as $Ca^{2+}$, $Mg^{2+}$ etc and strong electrolyte ions. When the water flows turn-back into the inner side dilute chamber unit, the ions contained in the water are generally weak ions such as $HSiO_3^-$, $CO_3^{2-}$ etc, and $H^+$, $OH^-$, and a small quantity of strong electrolyte ions with low valence. These weak ions which are relatively difficult to be deionized are now in the strong electric field of inner side dilute chamber unit and can be deionized under the strong electric field.

The central pipe can be a metallic pipe, and a conductive material can be surface-clad onto a structure fabricated from engineering plastics or other material. The conductive material can be titanium metal coated with ruthenium, or titanium metal coated with platinum, or nonmetallic conductor material, such as graphite. When used only as cathode, the conductive material can also be titanium metal or stainless steel metal.

The outer electrode can be a crust, or a conductive material disposed on a crust. It can be of a sheet or grid, or a cylindrical structure formed by wrapping or weaving strips and positioned between the crust and the helical wound cylindrical module, so as to form a concentric structure with the central electrode.

Preferably, the central pipe acts as anode, and the outer crust acts as cathode.

The covers comprise outer cover and inner cover. The outer cover, which is used for bearing pressure, can be composed of a metallic material. The inner cover, used to form a closed container with the crust, can be composed of a high molecular weight polymeric material, such as polyolefin, engineering plastics etc.

The separation of the dilute chamber can be achieved by any known manners, such as adhering or sewing the cation exchange membrane and anion exchange membrane which are used to form the dilute chamber, or placing a net-separating partition within the dilute chamber. Preferably, the dilute chamber is composed of a pair of cation exchange membrane and anion exchange membrane, as well as cation exchange resins and anion exchange resins filled therein. The two ends of the dilute chamber parallel to the central pipe are sealed, and the other two are open. The central section of the pair of cation and anion exchange membranes constituting the dilute chamber is adhered along axial direction. Because the two ends of the dilute chamber parallel to the central pipe are sealed and the other two are open, the dilute will flow along the axial direction. The pair of cation and anion exchange membranes constituting the dilute chamber is adhered around the middle section along the axial direction to form the outside and the inner side dilute chamber units.

Preferably, the ratio of membrane area of the inner side dilute chamber unit and that of the outside dilute chamber unit is 1:1-1:3, more preferably 1:1.25-1:1.5. The thickness of the dilute chamber is 3-8 mm.

Preferably, the upper and lower covers are connected via tie bars. The tie bars comprise a central bar and circumferential arranged side bars. The central bar is positioned inside the central pipe for sealing the apparatus, and the side bars are uniformly positioned around the edge of apparatus and used to seal the apparatus and connect the upper cover with the lower cover.

Preferably, the outer diameter ratio between the central pipe and the outside dilute chamber unit is 1:1.5-1:2.5.

Preferably, the ratio between the height and the diameter of the EDI apparatus is 1:0.7-1:2.

Preferably, the turn-back EDI apparatus has a helical wound structure, in which the cation and anion exchange membranes, the net-separating partition or the support frame positioned between the adjacent cation and anion exchange membranes, and the cation and anion exchange resins filled inside the dilute chamber are arranged in a helical wound manner.

Preferably, the turn-back EDI apparatus has a concentric structure, in which the cation and anion exchange membranes, the net-separating partition or the support frame positioned between the adjacent cation exchange membrane and anion exchange membrane, and the cation and anion exchange resins filled inside the dilute chamber are arranged in a helical wound manner.

Preferably, of the two ends of the cation and the anion exchange membranes perpendicular to the central pipe, one is flat and the other has a ladder shape with a sealing element. The axial length of the inner side dilute chamber unit is longer than that of the outside dilute chamber unit. Therefore, to achieve a better sealing effect for EDI apparatus, it is advantages to position the sealing element by making one end of the ion exchange membrane into a ladder shape.

The inner side and the outside dilute chamber units can be separated respectively into several sub-chamber units, and the several sub-chamber units connect in series to form the dilute flow, thereby allowing the dilute flow in a multiple turn-back way. The inner side and the outside dilute chamber unit can also be straight-through, and the dilute chamber is only separated into an inner side and an outside dilute chamber unit, so that the dilute turns back only once in the dilute chamber. Preferably, both of the inner side dilute chamber unit and the outside dilute chamber unit are straight-through along axial direction, because such structure is simple, cost-effective, and can achieve excellent deionization effects.

It can be understood from the principles of mass transfer that the ions tend to spontaneously migrate from a higher concentration to a lower concentration. Because a selective permeation of 100% can not be achieved by any ion exchange membrane, and actually, it is inevitable in EDI apparatus that a small amount of ions in the concentrate side will migrate into the dilute side. In order to eliminate this undesirable migration, which will consequently damage the quality of the product water, the pressure of dilute chamber must be controlled to be higher than that of the concentrate chamber at any point in whole deionization process.

Preferably, the two ends of the concentrate chamber parallel to the central pipe are open, and the other two ends are sealed. The concentrate chamber is provided with decompressing bands along the axial direction. The concentrate flows along the radial direction, and therefore the two ends parallel to the central pipe are open. The concentrate flows into the EDI apparatus from the outer crust, and flows out from the end of the central pipe after flowing along the radial direction of the EDI apparatus. The decompressing bands are used to balance the pressure of the concentrate side, and to ensure that the pressure of the dilute is higher than that of the concentrate in the outlet side. The positions of the decompressing bands in the concentrate chamber can correspond to the interface of the inside and outside dilute chamber units in the dilute chamber, close to the middle position between the cation exchange membrane and anion exchange membrane. The decompressing bands can be separated into several segments to enable the concentrate flow through the gap formed by the several segments of the decompressing bands, so as to reduce the pressure. The decompressing bands can be composed of rubber, plastic or other elastomer, which can be fixed by adhering, welding or other means.

The concentrate chamber can also be separated into several chamber units. Preferably, two ends of the concentrate chamber parallel to the central pipe are open, and the other two ends are sealed. The central section of the pair of cation exchange membrane and anion exchange membrane constituting the concentrate chamber is adhered along axial direction. A guide band is positioned along radial direction within at least one of the inner side and the outside concentrate chamber units. The concentrate chamber is separated into an inner side and an outside concentrate chamber unit by adhering a pair of cation exchange membrane and anion exchange membrane constituting the concentrate chamber at a position close to the center, and the pressure of the concentrate is therefore lower than that of the dilute in the outlet side. The arrangement of the guide band within the concentrate chamber enables the concentrate to flow turn-back in the inner side and outside concentrate chamber units along the axial direction. The concentrate first flows into the inner side concentrate chamber unit through the concentrate inlet in the central pipe of the apparatus. Then it flows from the central pipe side to the outer crust side along the radial direction. When the concentrate flows close to the adhering position of the cation exchange membrane and anion exchange membrane, it will turn back to the central pipe side through the guide band and flows out of the apparatus through the concentrate outlet in the central pipe side. Subsequently, the concentrate flows again into the outside concentrate chamber unit via an external concentrate pipe system, and then flows from the outer crust side to the central pipe side along the radial direction. When the concentrate flows close to the adhering position of the cation exchange membrane and anion exchange membrane, it will turn back to the outer crust side through the guide band and flows out of the apparatus through the concentrate outlet in the outer crust side. Subsequently, the concentrate flows again into inlet in the ventral pipe via the external concentrate pipe system. The guide band can be made of rubber, plastic or other elastomers, which can be fixed by adhering, welding or other means. The arrangement of the guide band ensures that the pressure gradient of the concentrate almost equal to the pressure gradient of the dilute, and ensures that the pressure of the dilute is higher than that of the concentrate in the whole membrane area.

The continuous circulation of the concentrate in the concentrate chamber allows an improved water recovery rate. But in the dilute chamber, particularly in the end of the dilute chamber, where the water purity is relatively high, it is easy for water to be ionized. More particularly, in the interface between the ion exchange resin and the ion exchange membrane, water tends to electrolyze to form $H^+$ and $OH^-$. In such a case, part of $H^+$ and $OH^-$ will permeate through the ion exchange membrane into the concentrate chamber, where they will recombine into $H_2O$. However, the surface of the concentrate chamber side of the cation exchange membrane exhibits strong acidic, indicating the existence of local high $H^+$ concentration. As comparison, the surface of concentrate chamber side of the anion exchange membrane exhibits strong alkaline, indicating the existence of local high $OH^-$ concentration.

While the water containing hardening ions, such as $Ca^{2+}$, $Mg^{2+}$, etc, flows through the positions with local high $OH^-$ concentration (generally at the outlet), the hardening ions, such as $Ca^{2+}$ and $Mg^{2+}$, probably will react with $OH^-$ and $CO_3^{2-}$ to form precipitation, which attaches inside the chamber and forms scales, thereby affecting the normal operations of the EDI apparatus.

Therefore, the concentrate can preferably be discharged out of the apparatus without circulating, so that the hardening ions, such as $Ca^{2+}$ and $Mg^{2+}$ are prevented from reacting with $OH^-$ and $CO_3^{2-}$ to form precipitation. This is helpful to maintain the pressure difference between the concentrate and the dilute.

In order to improve water recovery rate and to avoid scale formation, circulated and non-circulated flow of the concentrate can be carried out alternately in the concentrate chamber during deionization process.

Furthermore, in aqueous solution, the electrical current is carried by the migrations of cations and anions. In external circuit, however, the current is carried by the movement of electrons. In EDI apparatus, since the electrons and the ions convert or join each other in the interface between the electrode and the solution, electrode reactions occur inevitably in both the cathode and the anode of the EDI apparatus to release gases.

Anode: $OH^- - 4e = O_2 + 2H_2O$
$2Cl^- - 2e = Cl_2 \uparrow$
Cathode: $2H^+ + 2e = H_2 \uparrow$ Therefore, there is a certain amount of free chlorine with strong oxidizing ability in the EDI concentrate chamber, which will corrupt the ion exchange membrane in the concentrate side. Preferably, a protective adsorption membrane is disposed on the concentrate side of the cation exchange membrane and the anion exchange membrane. The protective adsorption membrane can be fabricated from active carbon fiber or other similar material. It is used to adsorb the free chlorine in the concentrate and to protect the ion exchange membrane from being corrupted.

In summary, the present invention has the following advantages: 1). The EDI apparatus of present invention is provided with inner side and outside dilute chamber units which make the dilute flow in a turn-back manner. This design realizes a simple structure, desirable design and lower flow resistance, and achieves a high deionization level of feed water, particularly, effectively improve the deionization of weak electrolyte by substantially utilizing the current density difference between the inner side and outside of the apparatus. Therefore, the problem of undesirable product quality caused by uneven current density is overcome and the quality of product water is improved. 2). The inner side chamber unit is higher than the outside chamber unit, which expedite make the flow speed and lowers the resistance. 3). The turn-back design shortens the length in axis direction, saves the material used in cathode, anode and exchange device, and reduces the cost, with the product quantity guaranteed. 4). The decompressing bands are disposed in the concentrate chamber, which balance the pressure of concentrate. Therefore, the pressure of the dilute is higher than that of the concentrate at any point during the whole operation process, which ensures the pressure of the dilute being higher than that of the concentrate in the outlet side of the apparatus. 5). The apparatus of the present invention solves the technical problems of overcurrent in central section in prior art, reduces electric consumption, and saves the manufacture cost of the apparatus.

DETAILED DESCRIPTION OF THE PREFERRED EMBODIMENTS

The present invention will be further illustrated by the representative embodiments and the drawings.

EXAMPLE 1

Figure 1:
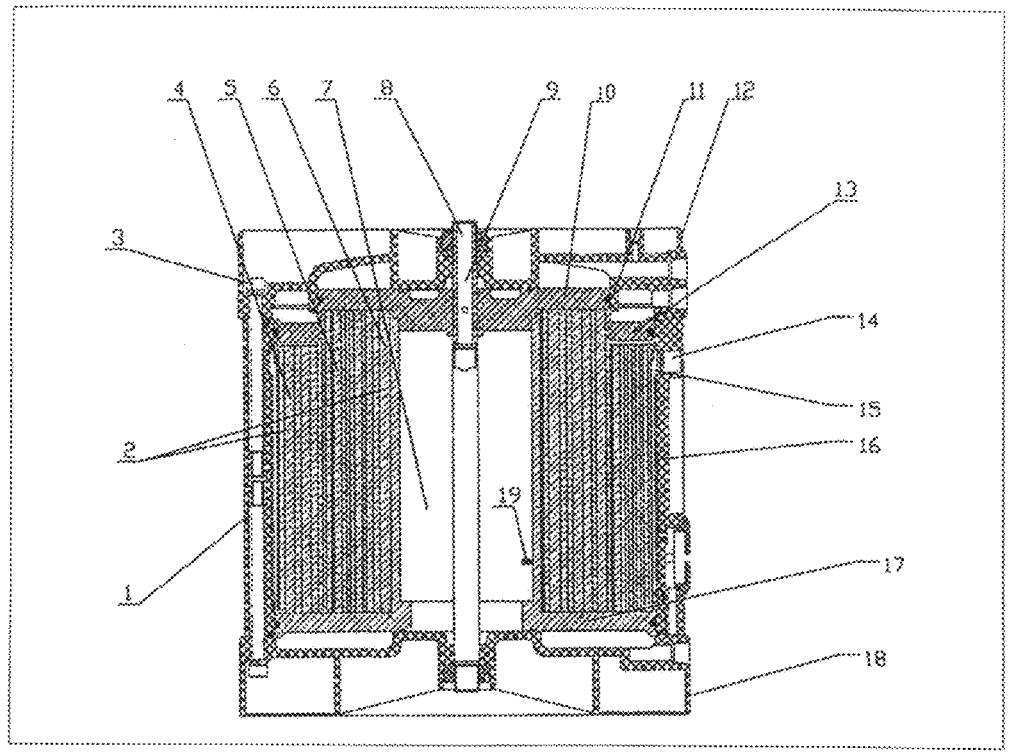
FIG. 1 is a schematic view of a turn-back electrodeionization apparatus according to the invention.
Figure 2:
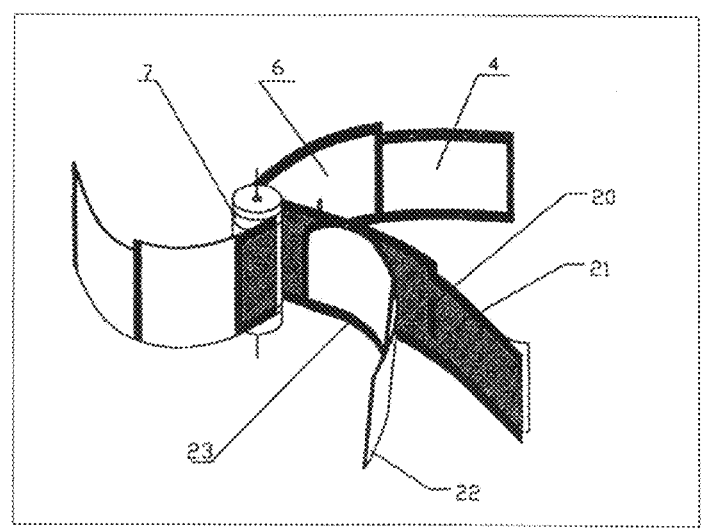
FIG. 2 is a three-dimensional exploded view of a turn-back electrodeionization apparatus according to the invention.
Figure 3:
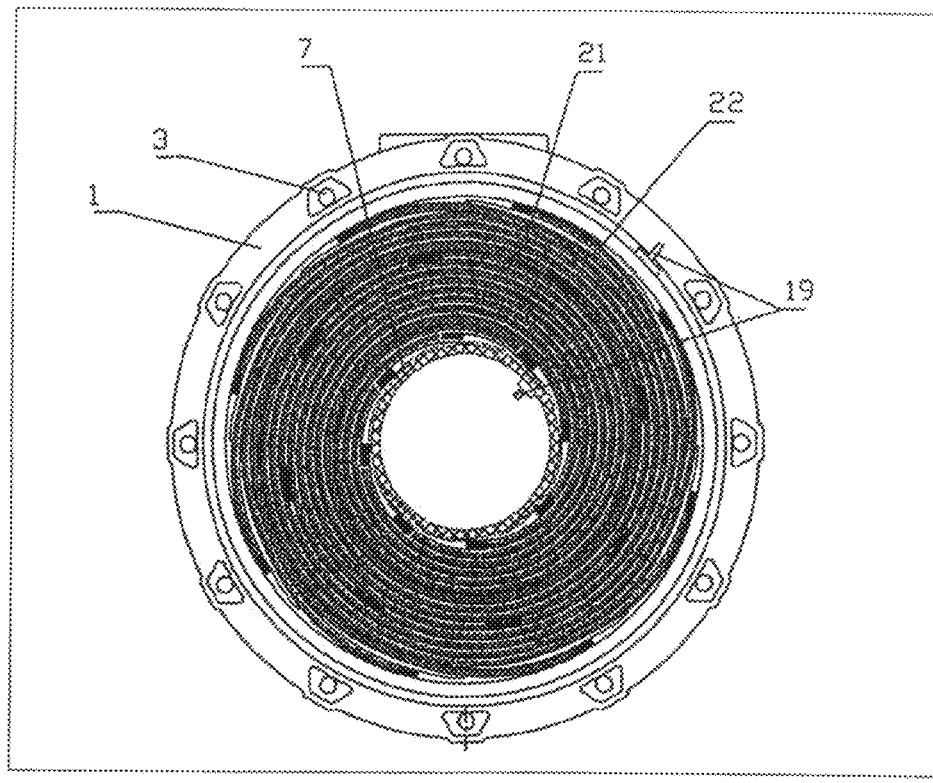
FIG. 3 is a cross-section view of a turn-back electrodeionization apparatus according to the invention.

As shown in FIGS. 1, 2 and 3, a turn-back EDI apparatus has central pipe 7 as central axis. The central pipe 7 is made of engineering plastics pipe and covered with ruthenium-coated titanium sheet, which is extended from the electrode terminal 19 to act as the anode of the apparatus. Eight pairs of cation exchange membrane and anion exchange membrane 22 are distributed evenly in the circumferential direction of the central pipe 7. In other words, the circumference of the central pipe 7 is divided into eight parts equally with each part connecting with one end of cation exchange membrane and anion exchange membrane pair 22. Of the two ends of the cation exchange membrane and anion exchange membrane pair 22 perpendicular to the central pipe 7, one is flat, and the other is a ladder shape with a sealing element 11 disposed on the ladder. The sealing element is an end ring used for sealing the apparatus. The dilute chamber and the concentrate chamber 5 are disposed alternatively on the two sides of the exchange membrane 22. The concentrate chamber 5 consists of a pair of cation exchange membrane and anion exchange membrane 22 and a net-separating partition 21 filled therein. The two ends of the ion exchange membrane pair 22 perpendicular to the central pipe 7 are adhered by polyurethane resin, and another two ends are open. The opening is positioned on the central pipe 7. The net-separating partition 21 is sandwiched by the two membranes. The side of the cation exchange membrane and the anion exchange membrane 22 close to the concentrate chamber 5 is covered by a layer of active carbon fiber so as to adsorb the residual chlorine in the concentrate. The dilute chamber is adjacent to the concentrate chamber 5.

In a pair of cation exchange membrane and anion exchange membrane 22 constituting the dilute chamber, two ends perpendicular to the central pipe 7 are provided with a strip-shaped support frame 23. The other two ends are also adhered by polyurethane resin, with ion exchange resin 2 filled therein.

Figure 6:
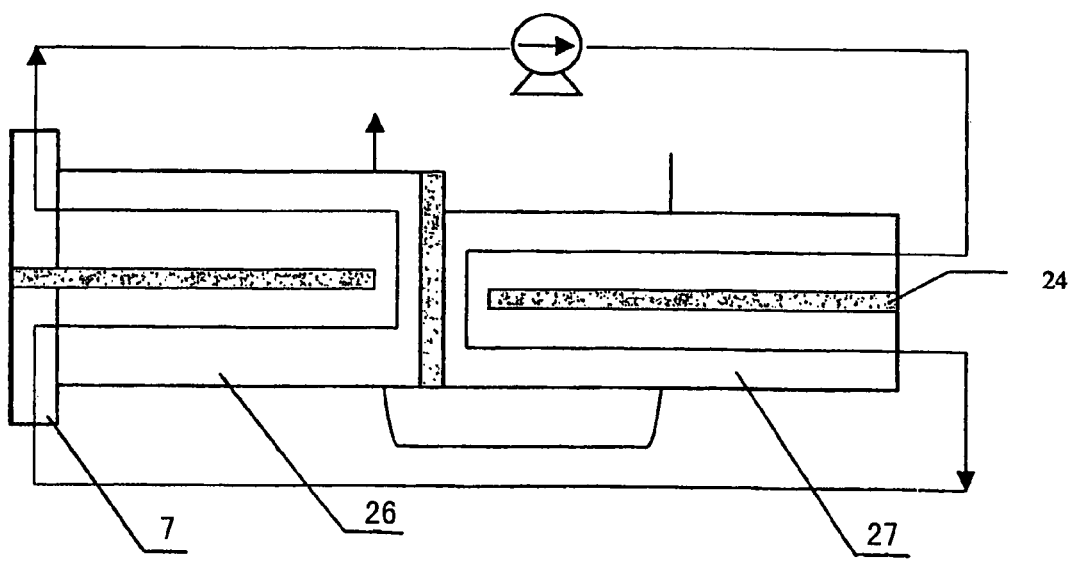
FIG. 6 is a section view showing the concentrate chamber and dilute chamber of another turn-back electrodeionization apparatus according to the invention.

A pair of cation exchange membrane and anion exchange membrane 22 which forms the dilute chamber is vertically adhered by epoxy resin close to the central section along the axial direction, so as to form the inner side dilute chamber unit 6 and the outside dilute chamber unit 4. The inner side dilute chamber unit 6 and the outside dilute chamber unit 4 are straight-through, respectively, with the membrane areas ratio of the two units of 1:1. The feed water enters the outside dilute chamber unit 4 from upper end 13 and flows through each section thereof along the axial direction to reach lower end 17 of the dilute chamber. The feed water then turns back and flows through each section of the inner side dilute chamber unit 6 and return to the inside outlet 10 of the apparatus, thereby forming a turn-back flow passage (as shown in FIG. 6). This design greatly reduces the current density differences among different sections of the periphery and the center of the apparatus. The feed water flows from the outside chamber unit and turns back to the inner side chamber unit. As a result, for the same length the feed water needs to flow through, the EDI apparatus of the present invention can be constructed in a smaller size (i.e., axial length shortened), but with the same water quality guaranteed. As a result, the EDI apparatus of the present invention can reduce both material and manufacture cost.

The two ends of the concentrate chamber 5 parallel to the central pipe 7 are open, and the other two ends are sealed, making the concentrate flow along the radial direction. A pair of cation exchange membrane and anion exchange membrane 22 forming the concentrate chamber is adhered near the central section in the concentrate chamber 5 in a direction parallel to the central pipe to form the inner side concentrate chamber unit 26 and the outside concentrate chamber unit 27. A guide band 24 is disposed close to the central section of the inner side and outside chamber units in the direction perpendicular to the central pipe 7. The concentrate flows from the concentrate inlet and passes through the inner side concentrate chamber unit 26 and the outside concentrate chamber unit 27 respectively, and then flows out from the concentrate outlet, forming a closed flow passage. In the closed flow passage, the concentrate first flows from the inlet in the central pipe of apparatus into the inner side concentrate chamber unit 26, and flows radially from the central pipe 7 side to the outer crust 1 side along the helical inner side concentrate chamber unit 26. The concentrate turns back to the central pipe 7 side near the adhering position of the cation and anion exchange membranes 22 via the guide band 24, and then flows out from the concentrate outlet at the central pipe 7. Subsequently, the concentrate flows back to the outside concentrate chamber unit 27 via an external pipe system, and flows radially from the outer crust 1 side to the central pipe 7 side along the helical outside concentrate chamber unit 27, and then turns back to the outer crust 1 side near the adhering position of the cation and anion exchange membranes 22 via the guide band 24. The concentrate finally flows out from the apparatus through its outside outlet and circulates to the concentrate inlet (as shown in FIG. 6). The concentrate inlet is the opening 8 on the central pipe, and the concentrate outlet is the opening 14 on the outer crust. This design helps to reduce the pressure difference between the dilute outlet side and concentrate outlet side, and make the pressure gradient of the dilute and the pressure gradient of the concentrate almost equal to each other, so that it ensures that the dilute pressure is higher than that of the concentrate in the whole membrane area.

The concentrate chamber and the dilute chamber formed by the cation exchange membrane and the anion exchange membrane 22 wind around the central pipe 7 to form a cylinder membrane module. The wound membrane module is enclosed by outer crust 1. The cation exchange membrane and anion exchange membrane 22, net-separating partition 21 and support frame 23 interposed between the cation exchange membrane and the adjacent anion exchange membrane, and cation exchange resin and anion exchange resin 2 filled within the dilute chamber are arranged in a helical wound structure. The titanium sheet 16 as cathode is disposed between the outer crust 1 and the wound cylinder. The upper cover 12 and the lower cover 18 are disposed in the upper and lower ends of the central pipe 7 and the outer crust 1, respectively, and the outer crust 1 is connected with the upper cover 12 and the lower cover 18 through the central tie bar 9 and twelve side tie bars equally distributed in the periphery circumference.

The diameter of the outside dilute chamber unit is Φ400 mm. The diameter of the inner side dilute chamber unit is Φ340 mm. The diameter of the central pipe 7 is Φ250 mm. The whole EDI apparatus has a periphery diameter of Φ440 mm and a height of 450 mm.

EXAMPLE 2

Figure 4:
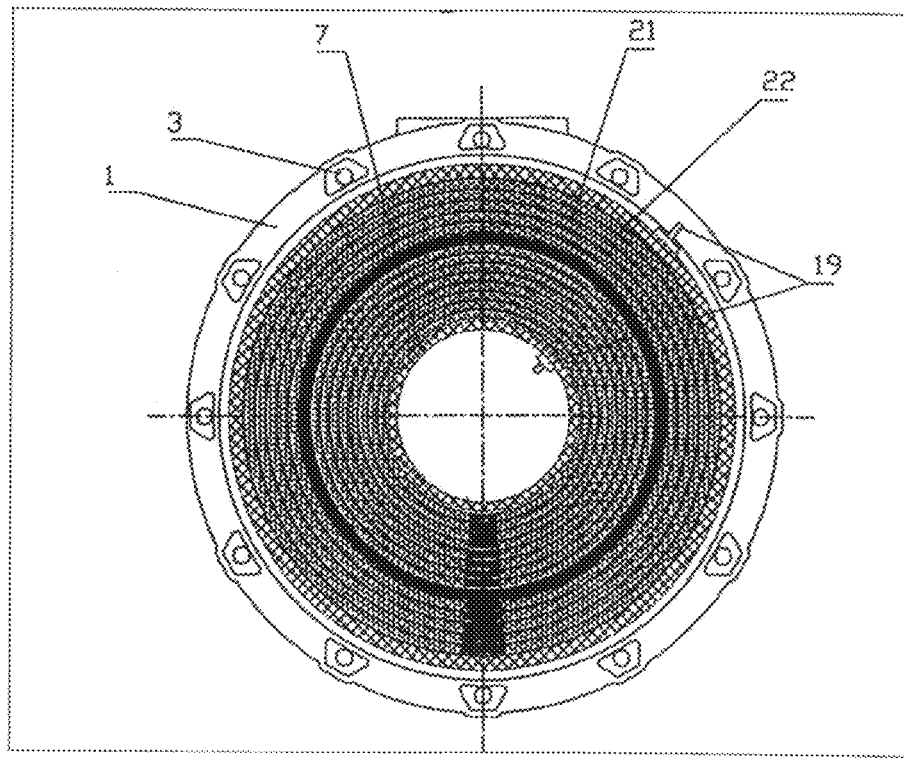
FIG. 4 is a cross-section view of another turn-back electrodeionization apparatus according to the invention.
Figure 5:
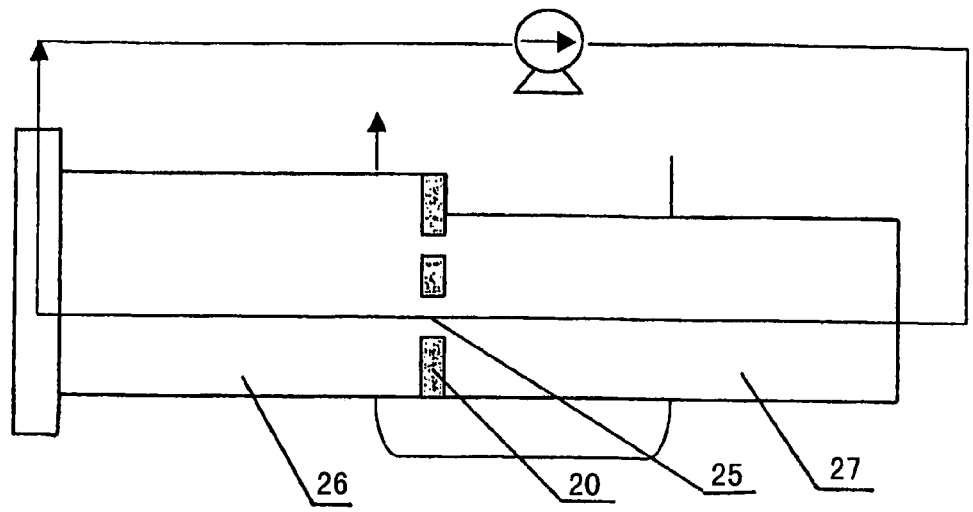
FIG. 5 is a section view showing the concentrate chamber and dilute chamber of a turn-back electrodeionization apparatus according to the invention.

As shown in FIGS. 1, 2 and 4, fifteen pairs of cation exchange membrane and anion exchange membrane 22 wind around the periphery of the central pipe of the turn-back EDI apparatus. The two ends of each pair of the cation exchange membrane and the anion exchange membrane 22 perpendicular to the central pipe 7 are adhered by epoxy resin. The net-separating partition 21 is disposed within the adhered cation exchange membrane and anion exchange membrane 22, thereby forming concentrate chamber 5. The two ends of the cation exchange membrane and the anion exchange membrane 22 parallel to the central pipe 7 are connected with the concentrate gathering pipe and distributing pipe respectively. The fifteen pairs of cation exchange membrane and anion exchange membrane 22 wind around the central pipe to form a concentric structure. The space between two pairs of cation exchange membrane and anion exchange membrane 22 adjacent to each other is the dilute chamber. The two ends of the dilute chamber parallel to the central pipe 7 are adhered by the epoxy resin, and the other two ends are adhered with support frame 23, in which ion exchange resin 2 is filled. The outer crust 1 is positioned outside the helical wound structure. The upper cover 12 and the lower cover 18 are disposed in the upper and lower ends of the central pipe 7 and the outer crust 1, respectively. The opening 8 is positioned on the central pipe 7, through which the concentrate come from the inlet 14 in the outer crust and passed through the cathode chamber 15 and the concentrate chamber 5 can flow out of the apparatus finally. As shown in FIG. 5, the decompressing band 20 is disposed near the central section in the concentrate chamber 5, and gap 25 is provided in the middle of the decompressing band 20, so that the concentrate is decompressed when it flows along radial direction. As a result, the dilute pressure is higher than that of the concentrate at the outlet. The concentrate flows in a circulative way. It flows from the concentrate inlet and enters each flow passage of the concentric structure via the concentrate distributing pipe, and then flows radially through the decompressed band 20 and converges in the concentrate gathering pipe. Finally, the concentrate flows out from outlet 8. The diameter of the outside dilute chamber unit is Φ350 mm. The diameter of the inner side dilute chamber unit is Φ280 mm. The diameter of the central pipe 7 is Φ160 mm. The periphery diameter of the whole EDI apparatus is Φ400 mm. The height of the apparatus is 430 mm. The structures of the other parts are the same as those in Example 1.

EXAMPLE 3

Figure 7:
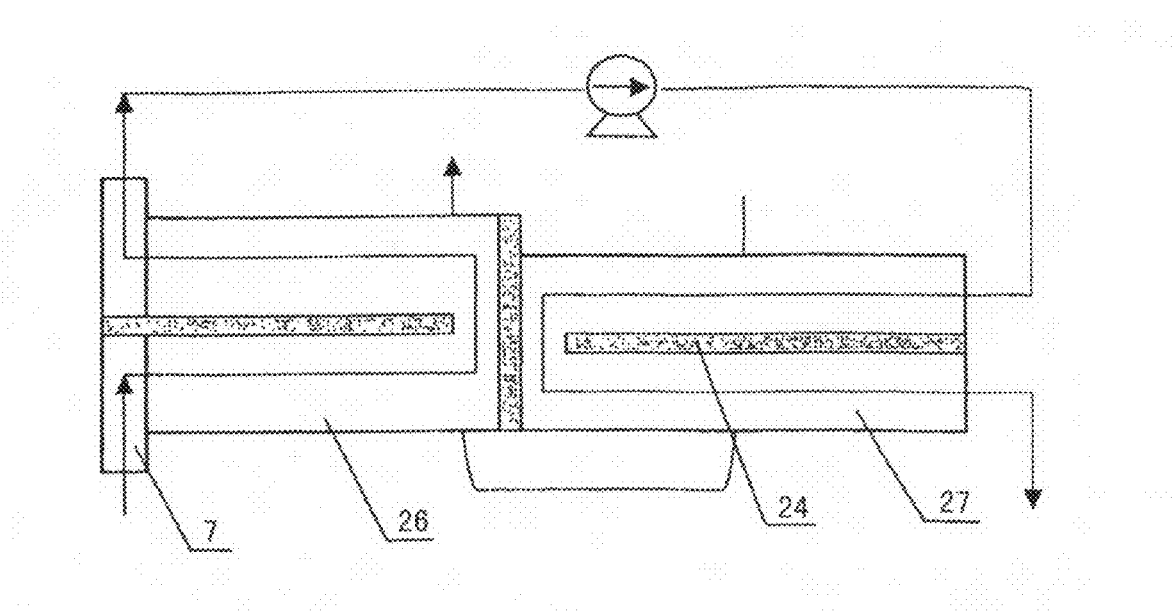
FIG. 7 is a section view showing the concentrate chamber and dilute chamber of still another turn-back electrodeionization apparatus according to the invention.

As shown in FIGS. 1, 2 and 3, the cation exchange membrane and anion exchange membrane 22 wind around the central pipe 7. The dilute chamber and the concentrate chamber 5 are provided on the two sides of the ion exchange membranes 22. Ion exchange resin 2 is filled in the dilute chamber, and the net-separating partition 21 is filled in the concentrate chamber 5. The EDI apparatus is helical wound structure, and the outside of the helical wound structure is the outer crust 1. The upper cover 12 and the lower cover 18 are disposed in the upper and lower ends of the central pipe 7 and the outer crust 1, respectively. As is shown in the FIG. 7, the concentrated water flows from the concentrate inlet of central pipe 7 and sequentially passes through the inner side concentrate chamber unit 26 and the outside concentrate chamber unit 27, and then flows out from the concentrate outlet on the side of outer crust 1, thereby forming a partially opened flow passage. In the flow passage, the concentrate first flows from the inlet in the central pipe of apparatus into the inner side concentrate chamber unit 26, then radially flows from the central pipe 7 side to the outer crust 1 side along the helical inner side concentrate chamber unit 26. The concentrate returns to the central pipe 7 side near the adhering position of the ion exchange membranes 22 via the guide band 24, and flows out from the concentrate outlet at the central pipe 7. Then, the water will be transferred to the outside concentrate chamber unit 27 through the external concentrate pipe, and radially flow from the outer crust 1 side to the central pipe 7 side along the helical outside concentrate chamber unit 27, and then return to the outer crust 1 side via the guide band 24 at a position close to the adhering section of the ion exchange membranes 22, and finally flow out of the apparatus from its outside concentrate outlet. The concentrate flows in a non-circulative way (as shown in FIG. 7). The opening 8 in the central pipe is the concentrate inlet, and the opening 14 in the outer crust is the concentrate outlet. This design is suitable for feed water with high hardness. It can prevent the apparatus from scaling and is helpful to reduce the pressure difference between the outlet of the dilute and the outlet of the concentrate, thereby making the pressure gradient of the dilute similar to that of the concentrate, so as to ensure that the dilute pressure is higher than the concentrate pressure in the whole membrane area. The diameter of the outside flow unit is Φ600 mm. The diameter of the inner side flow unit is Φ340 mm. The diameter of the central pipe 7 is Φ200 mm. The periphery diameter of the whole EDI apparatus is Φ440 mm. The height of the EDI apparatus is 450 mm. The width of the dilute chamber is 6 mm. The structures of the other parts are the same as those in Example 1.

EXAMPLE 4

Figure 8:
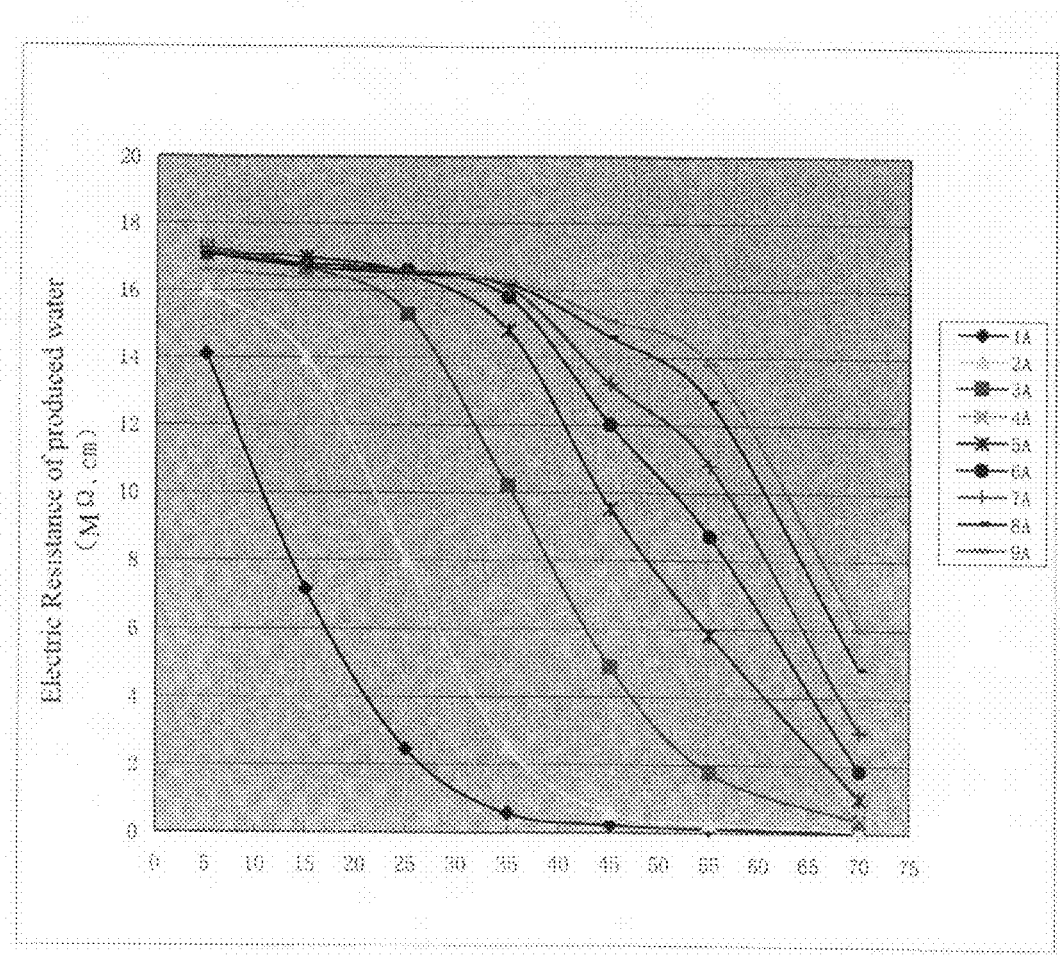
FIG. 8 is a chart comparing the performance of an electrodeionization apparatus according to the present invention with that of a prior art EDI in a deionization test.
Figure 8:
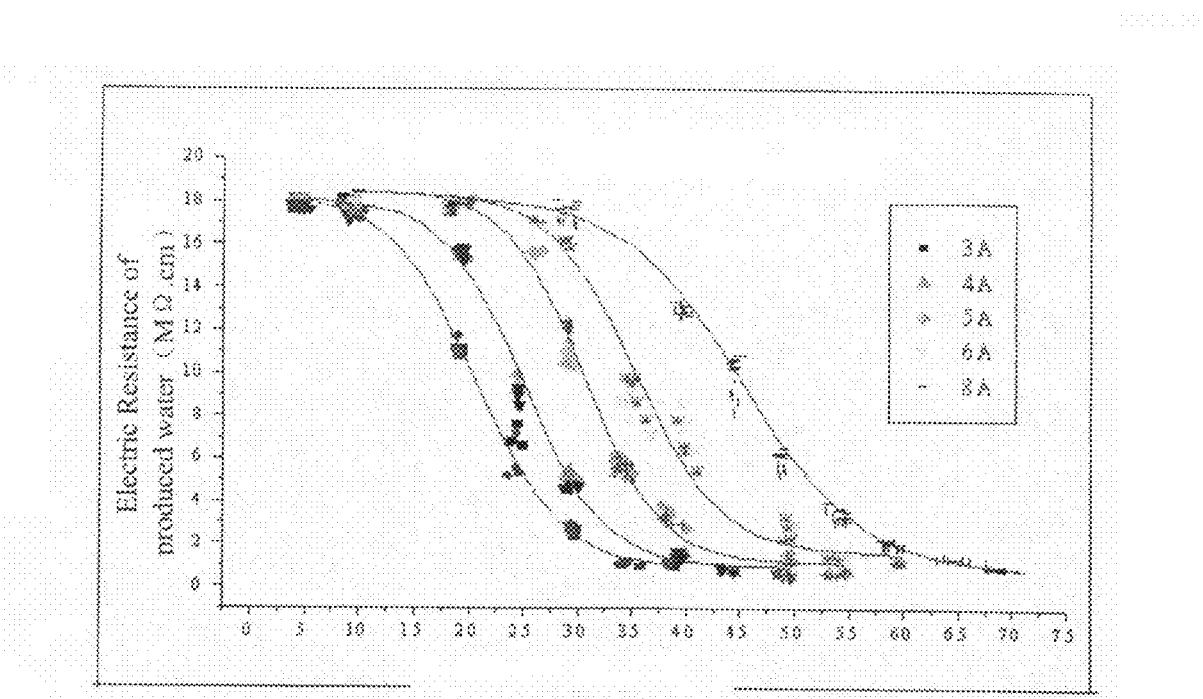

A deionization test was carried out to compare the deionization performance of the EDI apparatus of the present invention and that of a prior art EDI. The test results were shown in the following table 1 (FIGS. 8(1) and 8(2)):

Flow rate of produced or treated water (dilute): 2.8 m³/h
Conductivity of feed water (dilute): 40 μS/cm
Temperature of feed water (dilute): 25° C.
Conductivity of the concentrate: 400 μS/cm
pH of feed water(dilute): 6.5
Recovery ratio: 90%

TABLE 1 the result of the deionization test

| Apparatus | Voltage (V) | Current (A) | Resistance of the product water (MΩ·cm) |
|---|---|---|---|
| Example 1 | 72 | 5 | 15.6 |
| Prior art EDI | 96 | 8 | 13.6 |

EXAMPLE 5

Figure 9:
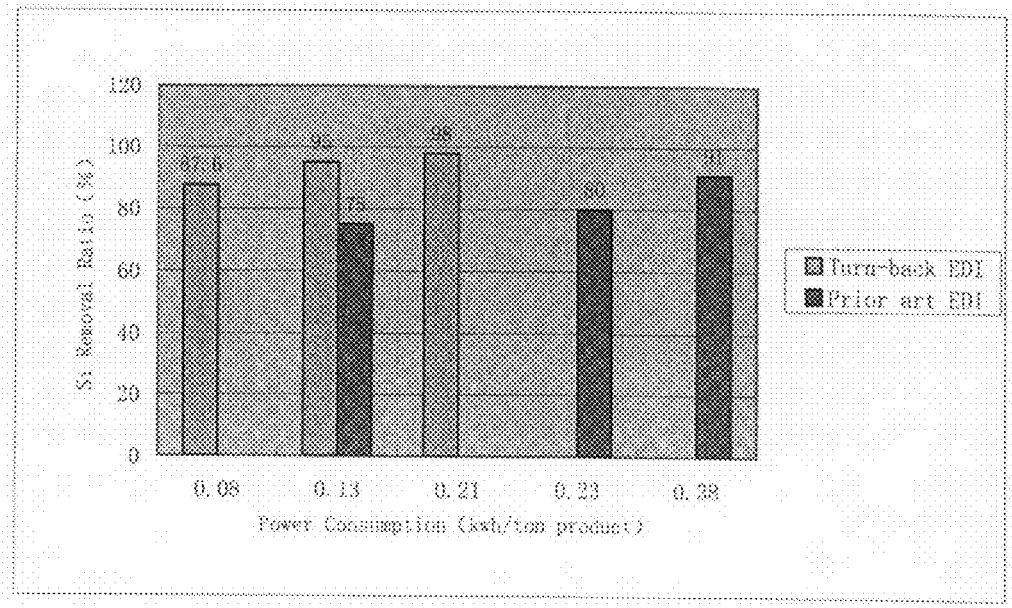
FIG. 9 is a chart comparing the performance of an electrodeionization apparatus according to the present invention with that of a prior art EDI in a silicon removal test.

A silica removal test comparing the EDI apparatus of the present invention with a prior art EDI in term of the silica removal performance was performed. The test results were shown in table 2 (FIG. 9):

Flow rate of produced or treated water (dilute): 2.8 m³/h
Conductivity of feed water (dilute): 40 μS/cm
Temperature of feed water (dilute): 25° C.
Conductivity of the concentrate: 400 μS/cm
pH of the dilute: 6.5
Recovery ratio: 90%

TABLE 2 the result of the silica removal test

| Apparatus | Voltage (V) | Current (A) | Si concentration of the feed water (ppb) | Si removal ratio (%) |
|---|---|---|---|---|
| Example 1 | 68 | 4 | 450 | 95 |
| Prior art EDI | 75 | 4 | 450 | 70 |

We claim:

1. A turn-back electrodeionization device comprising: a central pipe which acts as an electrode, an outer crust which is concentric with the central pipe, and an outside electrode; an upper and a lower cover which are disposed at the ends of the central pipe and the outer crust respectively; anion exchange membranes and cation exchange membranes which are alternately positioned between the central pipe and the outer crust forming a concentrate chamber and a dilute chamber at two sides of the ion exchange membranes, respectively; and ion exchange resins filled in at least one of the concentrate chamber and dilute chamber; wherein the anion exchange membranes and cation exchange membranes wind around the central pipe to form a helical wound cylindrical unit; and wherein the dilute chamber includes two ends parallel to the central pipe that are sealed and two ends perpendicular to the central pipe that are open and is separated into an inner side dilute chamber unit and an outside dilute chamber unit wherein the inner side dilute chamber unit and the outside dilute chamber unit extend straight-through along the axial direction such that dilute sequentially passes through the outside dilute chamber unit and inner side dilute chamber unit in a turn-back way.

2. The turn-back electrodeionization device of claim 1, wherein the dilute chamber is formed by a pair of cation exchange membrane and anion exchange membrane, with cation exchange resins and anion exchange resins filled therein; the two ends of the dilute chamber parallel to the central pipe are sealed, and the other two ends are open; and the central section of the pair of cation exchange membrane and anion exchange membrane constituting the dilute chamber is adhered along axial direction.

3. The turn-back electrodeionization device of claim 1, wherein the turn-back electrodeionization device has a helical wound structure, in which the cation exchange membranes and anion exchange membranes, and cation exchange resin and anion exchange resin filled inside the dilute chamber are arranged in a helical wound manner.

4. The turn-back electrodeionization device of claim 1, wherein the turn-back electrodeionization device has a concentric structure, in which the cation exchange membranes and anion exchange membranes, and cation exchange resin and anion exchange resin filled inside the dilute chamber are arranged concentrically.

5. The turn-back electrodeionization device of claim 1 wherein said cation exchange membrane and anion exchange membrane have two ends perpendicularly to the central pipe, of which one end is flat, and the other has a ladder shape with a sealing element disposed thereon.

6. The turn-back electrodeionization device of claim 1, wherein said cation exchange membrane and anion exchange membrane have two ends perpendicularly to the central pipe, of which one end is flat, and the other end has a ladder shape with a sealing element disposed thereon.

7. The turn-back electrodeionization device of claim 6, wherein the two ends of the concentrate chamber parallel to the central pipe are open, and the other two ends are sealed; and a decompressing band is disposed along axial direction in the concentrate chamber.

8. The turn-back electrodeionization device of claim 7, wherein the upper cover and the lower cover are connected via tie bars, said tie bars comprising a central bar and side tie bars in which the central bar is disposed inside the central pipe, and the side bars are circumferentially arranged in the edge of the device.

9. The turn-back electrodeionization device of claim 6, wherein the two ends of the concentrate chamber parallel to the central pipe are open, and the other two ends are sealed; the central section of the pair of cation exchange membrane and anion exchange membrane forming the concentrate chamber is adhered along axial direction, and a guide band is disposed along radial direction in at least one of the inner side concentrate chamber unit and the outside concentrate chamber unit.

10. The turn-back electrodeionization device of claim 9, wherein the upper cover and the lower cover are connected via tie bars, said tie bars comprising a central bar and side tie bars in which the central bar is disposed inside the central pipe, and the side bars are circumferentially arranged in the edge of the device.

11. The turn-back electrodeionization device of claim 1 wherein the upper cover and the lower cover are connected via tie bars, said tie bars comprising a central bar and side tie bars in which the central bar is disposed inside the central pipe, and the side tie bars are circumferentially arranged in the edge of the device.

12. The turn-back electrodeionization device of claim 1 wherein the outer diameter ratio between the central pipe and the outside dilute chamber unit is 1:1.5-1:2.5.

13. The turn-back electrodeionization device of claim 1 wherein the ratio between the height and the diameter of the electrodeionization device is 1:0.7-1:2.

14. The turn-back electrodeionization device of claim 1 wherein the concentrate chamber side of the cation exchange membrane and anion exchange membrane is covered with a protective adsorption membrane.

15. The turn-back electrodeionization device of claim 1, wherein the membrane area ratio of the inner side dilute chamber unit and the outside dilute chamber unit is 1:1 to 1:3.

16. A turn-back electrodeionization device comprising:
a central pipe, an outer crust which is concentric with the central pipe,
alternate layers of anion membrane and cation membrane positioned between the central pipe and the outer crust to form a concentrate chamber and a dilute chamber; the alternate layers of anion membrane and cation membrane are wound around the central pipe to form a helical wound cylindrical unit; wherein at least one of the concentrate chamber or the dilute chamber is filled with ion exchange resins; and wherein:
the dilute chamber is separated into an inner side dilute chamber unit and an outside dilute chamber unit have a respective membrane area ratio of from about 1:1 to 1:3, and wherein the inner side dilute chamber and the outside dilute chamber are connected such that, when in operation, dilute water flows through each of the inner side and outside dilute chamber units sequentially in opposite directions which are both substantially parallel to the central pipe.

17. The turn-back electrodeionization device of claim 16 comprising: a central pipe, an outer crust which is concentric with the central pipe, alternate layers of anion membrane and cation membrane positioned between the central pipe and the outer crust to form a concentrate chamber and a dilute chamber; the alternate layers of anion membrane and cation membrane are wound around the central pipe to form a helical wound cylindrical unit;
wherein at least one of the concentrate chamber or the dilute chamber is filled with ion exchange resins; and the concentrate chamber is separated into an inner side concentrate chamber unit and an outside concentrate chamber unit connected sequentially in such a way that, when in operation, the concentrate water flows through each of the inner side concentrate chamber unit and the outside concentrate chamber unit sequentially.

18. The device of claim 16, wherein the concentrate chamber is separated into an inner side concentrate chamber unit and an outside concentrate chamber unit connected sequentially in such a way that, when in operation, the concentrate water flows through each of the inner side concentrate chamber unit and the outside concentrate chamber unit sequentially.

* * * * *